United States Patent
Ohnstein et al.

(10) Patent No.: US 7,154,362 B2
(45) Date of Patent: Dec. 26, 2006

(54) ROBOTIC MEMBER

(75) Inventors: Thomas R. Ohnstein, Roseville, MN (US); Daniel W. Youngner, Maple Grove, MN (US); Robert D. Horning, Savage, MN (US)

(73) Assignee: Honeywell International, Inc., Morristown, NJ (US)

( * ) Notice: Subject to any disclaimer, the term of this patent is extended or adjusted under 35 U.S.C. 154(b) by 165 days.

(21) Appl. No.: 10/712,840

(22) Filed: Nov. 12, 2003

(65) Prior Publication Data

US 2005/0099254 A1    May 12, 2005

(51) Int. Cl.
*H01F 7/00* (2006.01)

(52) U.S. Cl. ...................................... 335/229
(58) Field of Classification Search ........ 335/229–234, 335/78; 200/181
See application file for complete search history.

(56) References Cited

U.S. PATENT DOCUMENTS

| | | | |
|---|---|---|---|
| 5,029,101 A | | 7/1991 | Fernandes |
| 5,142,935 A | * | 9/1992 | Carr .......................... 74/502.6 |
| 5,355,743 A | | 10/1994 | Tesar |
| 5,386,741 A | | 2/1995 | Rennex |
| 5,567,110 A | | 10/1996 | Sutherland |
| 5,638,946 A | * | 6/1997 | Zavracky .................... 200/181 |
| 5,662,587 A | | 9/1997 | Grundfest et al. |
| 5,901,939 A | | 5/1999 | Cabuz et al. |
| 5,914,553 A | * | 6/1999 | Adams et al. .............. 310/309 |
| 6,106,245 A | | 8/2000 | Cabuz |
| 6,109,852 A | | 8/2000 | Shahinpoor et al. |
| 6,138,604 A | * | 10/2000 | Anderson et al. ........... 114/332 |
| 6,147,422 A | | 11/2000 | Delson et al. |
| 6,184,607 B1 | | 2/2001 | Cabuz et al. |
| 6,184,608 B1 | | 2/2001 | Cabuz et al. |
| 6,255,758 B1 | | 7/2001 | Cabuz et al. |
| 6,358,021 B1 | | 3/2002 | Cabuz |
| 6,450,104 B1 | | 9/2002 | Grant et al. |
| 6,454,624 B1 | | 9/2002 | Duff et al. |
| 6,461,337 B1 | | 10/2002 | Minotti et al. |

(Continued)

FOREIGN PATENT DOCUMENTS

JP        61065795        4/1986

(Continued)

OTHER PUBLICATIONS

Gravagne, et al., Kinematics for Constrained Continuum Robots Using Wavelet Decomposition, Robotics 2000, proceedings of the 4th International Conference and Exposition/Demonstration on Robotics for Challenging Situations and Environments, pp. 1-7, Feb. 2000.

(Continued)

*Primary Examiner*—Elvin Enad
*Assistant Examiner*—Bernard Rojas
(74) *Attorney, Agent, or Firm*—Fogg and Associates; Scott V. Lundberg

(57) ABSTRACT

An elongated robotic member that is simple in design and structure, relatively inexpensive and consumes little power. In one illustrative embodiment, one or more linear actuators are used in conjunction with two or more plates that are fixed at spaced locations along a spine member. Fixed between each pair of plates is one or more actuators, which when activated, pull or push corresponding portions of the plates towards or away from each other. This changes the relative orientation of the plate pairs, thus providing a bending movement. The spine preferably is flexible at least in the lateral direction, and bends in response to the relative movement of the plates. A number of plate pairs may be provided to create an arbitrarily long robotic member.

27 Claims, 16 Drawing Sheets

U.S. PATENT DOCUMENTS

| 6,512,345 | B1 | 1/2003 | Borenstein et al. | |
|---|---|---|---|---|
| 2002/0039620 | A1 | 4/2002 | Shahinpoor et al. | |
| 2002/0043950 | A1 | 4/2002 | Yim et al. | |
| 2002/0152006 | A1 | 10/2002 | Bennett, III et al. | |
| 2003/0006669 | A1 | 1/2003 | Pei et al. | |
| 2003/0179058 | A1* | 9/2003 | Vaitkus et al. | 335/78 |

FOREIGN PATENT DOCUMENTS

| WO | WO0117731 | 3/2001 |
|---|---|---|

OTHER PUBLICATIONS

Gravagne, et al. "Mine-Sniffing Robotic Snakes and Eels: Fantasy or Reality?," Proceedings of the 5th Intl. Symp. Technology and the Mine Problem, Apr. 22-25, 2002, pp. 1-8.

Gravagne, et al. "On the Kinematics of Remotely-Actuated Continuum Robots", Proceedings of the 2000 IEEE International Conference on Robotics and Automation, pp. 2544-2550, Apr. 2000.

Hirose, et al. "Snakes and Stings: New Robotic Components for Rescue Operations," Experimental Robotics VIII, pp. 48-61, 2003.

Horning, et al. "Polymer-Based MEMS Actuators for Biometics," Neurotechnology for Biometic Robots, MIT Press, pp. 173-185, 2002.

Moon, B.R., et al. "Kinematics, Muscular Activity and Propulsion in Gopher Snakes," Journal of Experimental Biology, 201, pp. 2669-2684, 1998.

Paap, K.L., et al. "A Robot Snake to Inspect Broken Buildings," Proceedings of the 2000 IEEE/RSJ International Conference on Intelligent Robots and Systems, pp. 2079-2082, 2000.

Sofge, D., et al., "Design, Implementation, and Cooperative Coevolution of an Autonomous/Teleoperated Control System for a Serpentine Robotic Manipulator," pp. 1-7, prior to filing date Nov 2003.

* cited by examiner

ROBOTIC MEMBER

FIELD

The present invention is related to robotic members, and more particularly, to elongated robotic members.

BACKGROUND

Various attempts have made to develop elongated robotic members. Many of these elongated robotic members attempt to mimic or recreate movement found in the animal world. The development of robotic snakes and elephant trunks are just a few examples. In designing and constructing such elongated robotic members, one of the main difficulties is achieving simplicity in design and structure. Many prior attempts use relatively complicated hydraulic, cable and pulley, and/or other complicated structures that can be expensive, cumbersome, heavy, and power hungry. Such designs are unworkable for many applications.

SUMMARY

The present invention provides an elongated robotic member that is simple in design and structure, relatively inexpensive and consumes little power. In one illustrative embodiment, one or more linear actuators are used in conjunction with two or more plates that are fixed at spaced locations along a spine member. Fixed between each pair of plates is one or more actuators, which when activated, pull and/or push corresponding portions of the plates towards or away from each other. This changes the relative orientation of the plate pairs, thus providing a bending movement along the length of the elongated robotic member. A number of plate pairs may be provided to create an arbitrarily long robotic member.

The actuators may take any suitable form that allows for expansion and/or contraction of the actuators. In one illustrative embodiment, the actuators include an array of relatively small electrostatically actuated unit cells. Collectively, the array of unit cells can exert a significant force. In some embodiments, each of the array of unit cells include a three-dimensional arrays of unit cells that have a number of layers of unit cells stacked one upon another, and are constructed using lamination, ink-jet printing, deposition, and/or any other suitable process, as desired. Such electrostatic actuators may be relatively easy and inexpensive to construct, relatively compact, and consume relatively low power.

In one illustrative embodiment, a first array of electrostatically actuated unit cells collectively forming a first actuator is coupled to a first region of a first plate and a corresponding region of an adjacent second plate. Like above, the first and second plates may be fixed at spaced locations along a spine member, with the first actuator positioned between the plates. In some embodiments, the plates are spaced such that the array of unit cells is pretensioned in an expanded configuration.

When a sufficient voltage is applied to the first array of unit cells, or a portion thereof, one or more of the expanded unit cells may close and pull the corresponding regions of the first and second plates towards one another, thus bending the spine member in a corresponding direction. In some embodiments, additional actuators are fixed between the first plate and the second plate, preferably at different regions of the first plate and the second plate. The additional actuators may provide and control additional degrees of freedom of movement. In one example, when one actuator is actuated, the spine member may bend in a first direction, and when another actuator is actuated, the spine member may bend in a second direction. In some cases, two or more actuators may be actuated to bend the spine member in yet a third direction.

To provide further control, it is contemplated that individual unit cells, or groups of unit cells, in one or more of the actuator arrays may be separately addressable. That is, rather than just having a closed and open position, the actuators may have some intermediate states between the closed and open positions, depending on which unit cells or groups of unit cells are addressed. A controller may be provided to control the actuators to provide the desired movement.

DETAILED DESCRIPTION

The following detailed description should be read with reference to the drawings. The drawings, which are not necessarily to scale, depict illustrative embodiments and are not intended to limit the scope of the invention.

Figure 1A:
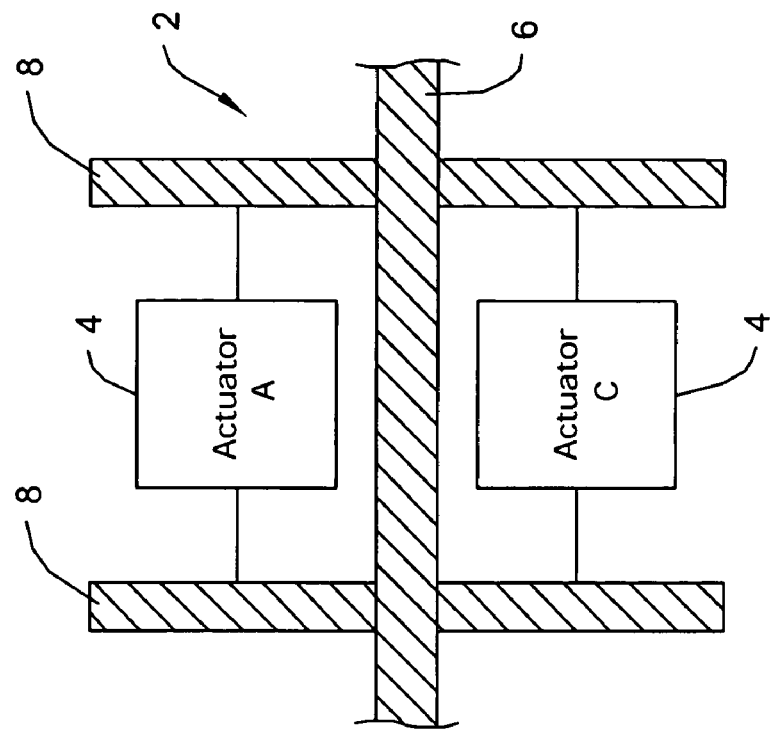
FIG. 1A illustrates a schematic cross-sectional view of the actuating device of FIG. 1 taken along line 1A—1A.
Figure 1:
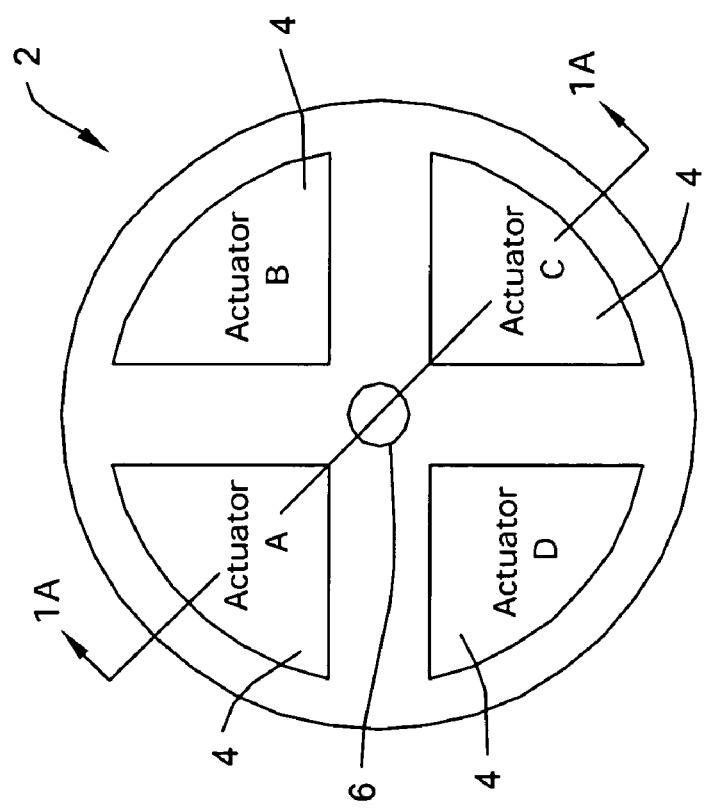
FIG. 1 illustrates a schematic diagram of an elongated robotic member having a at least two spaced plates, a spine member and a number of actuators.

FIG. 1 illustrates a schematic diagram of an elongated robotic member having at least two spaced plates, a spine member and a number of actuators. The illustrative elongated robotic member is generally shown at 2, and includes a number of actuators 4 disposed about a spine member 6. While the spine member 6 is shown at the center of the elongated robotic member, it is contemplated that the spine member 6 it may be offset to one side or the other. In addition, two or more spine members may be provided, if desired.

FIG. 1A illustrates a schematic cross-sectional view of the elongated robotic member of FIG. 1 taken along line 1A—1A. As can be seen from FIG. 1A, two spaced plates 8 are fixed to the spine member 6 at spaced locations, with the actuators 4 situated between the plates and attached to corresponding regions of the plates 8. In the illustrative embodiment, the actuators 4 are coupled to the plates 8 so that each actuator 4 may apply a force between the plates 8. It is contemplated that the spine member 6 may take a variety of forms, but preferably is sufficiently axially rigid to maintain a desired spacing between the two plates near the spine member, and laterally flexible enough so that the actuators can bend the spine member when actuated. In addition, and in some cases, the spine member 6 may be offset to one side or the other, such as along the top of plates 8.

The actuators 4 may take a variety of forms, and may in some cases be of different types along the length of the elongated robotic member 2, and/or even between a plate pair. The actuators 4 may be, for example, push and/or pull actuators. In some embodiments, the actuators 4 are hydraulic, pneumatic, electrical, gear driven, and/or pulley systems. In addition, some of the actuators 4 may be passive devices, such as springs. In one example, actuator A of FIG. 1 may be an electrostatic actuator (an example of which is described and explained below), while another actuator 4 such as actuator C may be a simple spring. In such an embodiment, it can be seen that varying only the output of one actuator 4 (Actuator A) may create a desired movement because the other actuator 4 (Actuator C) may exert a counter or return force. In one illustrative embodiment, all of the actuators 4 are electrostatic actuators.

Figure 1B:
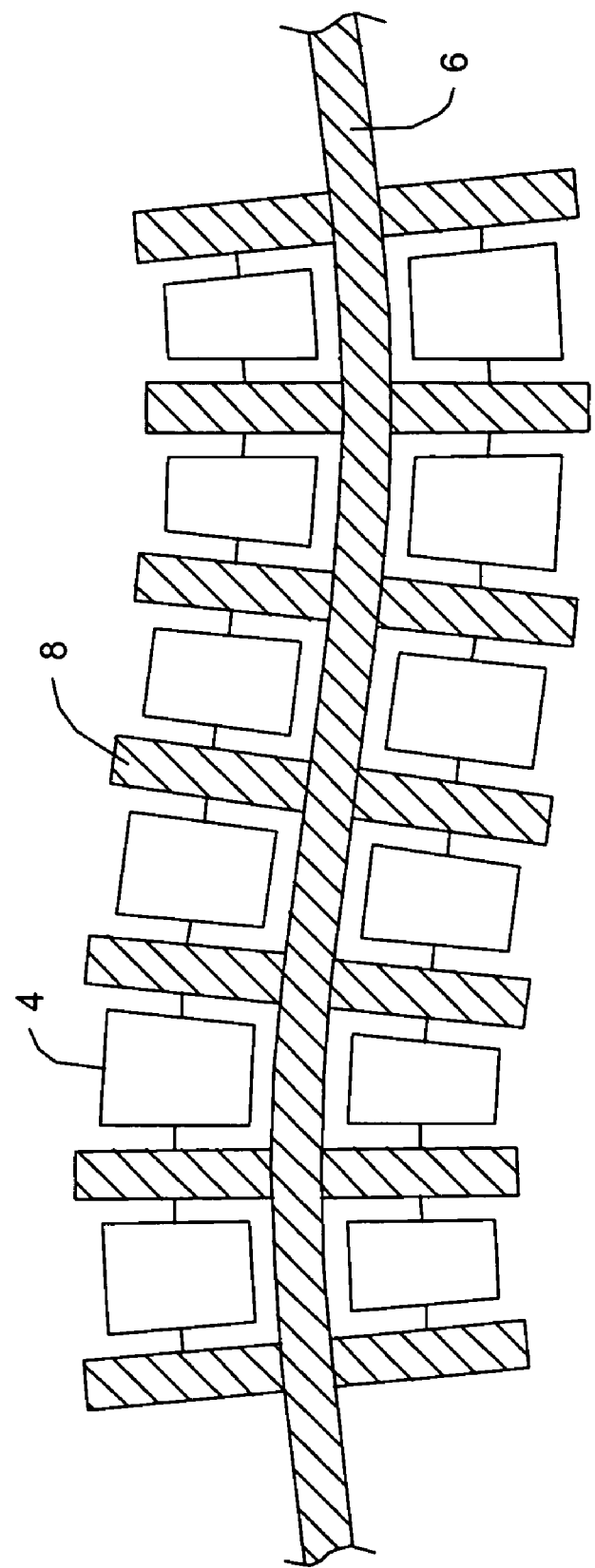
FIG. 1B is a schematic diagram of a spine member having a number of plate pairs fixed along its length.

With the lateral flexibility of the spine member 6, if one of the actuators 4, such as actuator A, is actuated and exerts a force between the plates, the spine member 6 may bend in response. FIG. 1B is a schematic diagram of the spine member 6 having a number of plate pairs fixed along its length. Between each plate pair is one or more actuators, as illustrated in FIG. 1 above. By properly controlling the actuators, the elongated robotic member of FIG. 1B may move and assume any predetermined shape. For example, in a robotic snake application, the actuators may be controlled to provide locomotion that mimics the movement of a natural snake. The possible locomotive patterns include, for example, lateral undulation, side-winding, rectilinear propagation, lateral rolling, wheeled rolling, axial propagation, and concertina motion. For medical applications, the actuators may be controlled to provide locomotion that mimics a worm, or may assume a shape that conforms to a particular anatomy, such as an artery or other lumen or cavity within the body.

Figure 2:
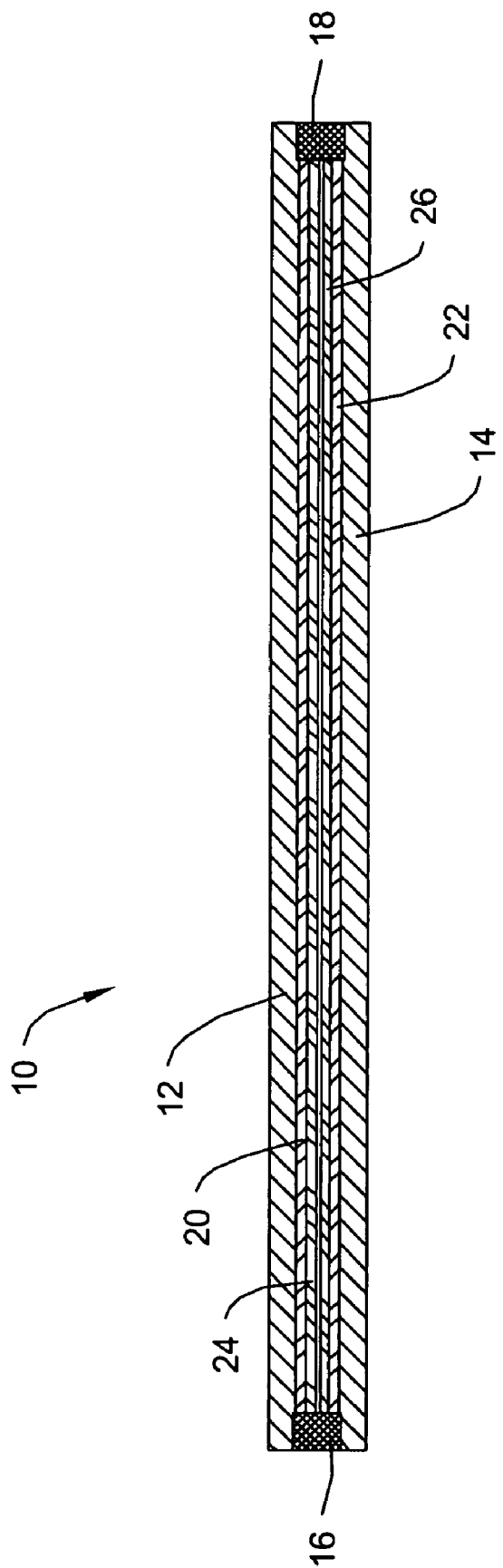
FIG. 2 is a schematic cross-sectional view of an electrostatically actuated unit cell for use in an electrostatic actuator.

As indicated above, the actuators may be any type of actuator, including electrostatic actuators. An electrostatic pull-type actuator may include a number of unit cells that are arrayed horizontally and stacked vertically to make a synthetic "muscle". FIG. 2 is a schematic cross-sectional view of an electrostatically actuated unit cell 10 for use in an electrostatic actuator. The unit cell 10 may be similar to, for example, the unit cell disclosed in U.S. Pat. Nos. 6,411,013, 6,255,758, or 6,184,608, all of which are assigned to the assignee of the present invention, and all of which are incorporated herein by reference.

In one illustrative embodiment, the unit cell 10 is formed using two flexible thin polymeric sheets 12 and 14, though any other suitable material may be used. The sheets 12 and 14 are shown adhered together at chosen spaced locations 16 and 18. Thin metal electrode layers 20 and 22 and dielectric layers 24 and 26 are placed on the sheets 12, 14, as shown.

Figure 3:
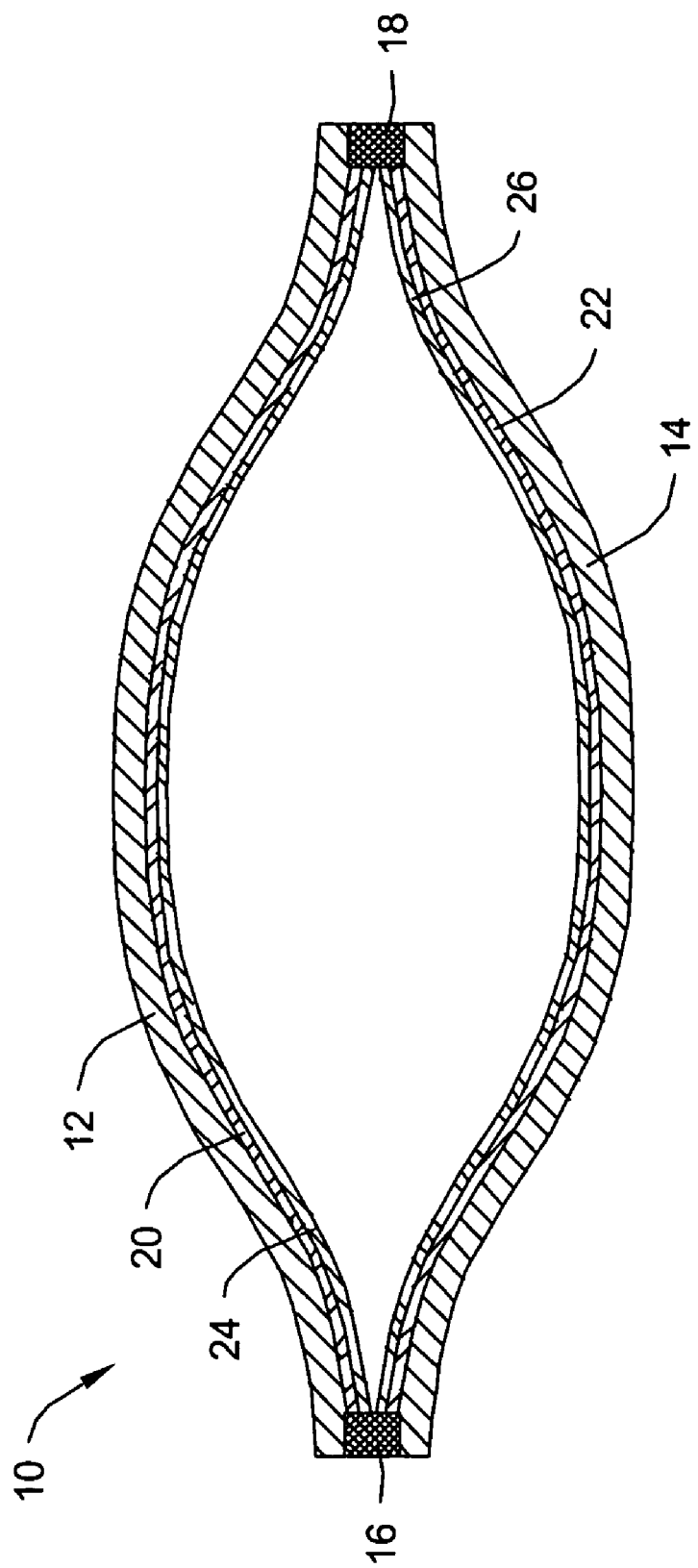
FIG. 3 show the electrostatically actuated unit cell of FIG. 2 in an expanded state.

FIG. 3 shows the electrostatically actuated unit cell of FIG. 2 in an expanded state. In one illustrative embodiment, the plate pairs of, for example, FIG. 1A are spaced sufficiently apart such that when the electrostatically actuated array of unit cells is attached to and between the plate pairs, at least some of the unit cells 10 assume the expanded state, as shown in FIG. 3. Once expanded, an electrostatic force may be generated by applying a potential between the metal electrode layers 20 and 22, which creates an attractive force between the metal electrode layers 20 and 22. When the attractive electrostatic force exceeds the expansion force, the unit cell 10 will tend to close and return to the configuration shown in FIG. 2. The unit cell 10 may begin closing near the spaced locations 16 and 18, and then close toward the center, as the electrostatic force will be greatest, initially, where the metal electrode layers 20 and 22 are the closest together. In some embodiments, the unit cell 10 is constructed so that it is relatively long in the direction going into the drawing, such that, when expanded, the sheets 12 and 14 look like corrugated sheets.

Figure 4:
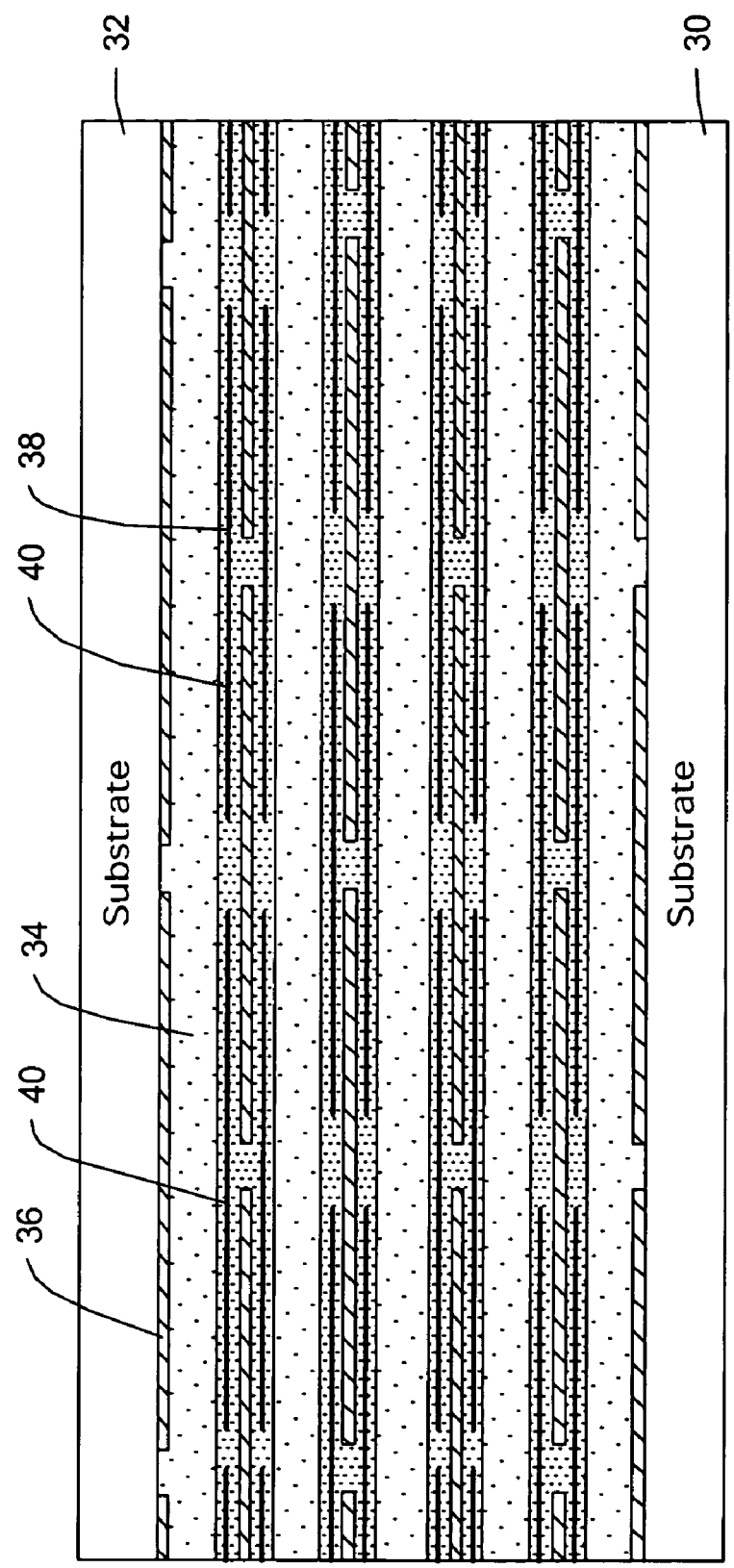
FIGS. 4–6 illustrate a method of making an array of electrostatically actuated unit cells.
Figure 5:
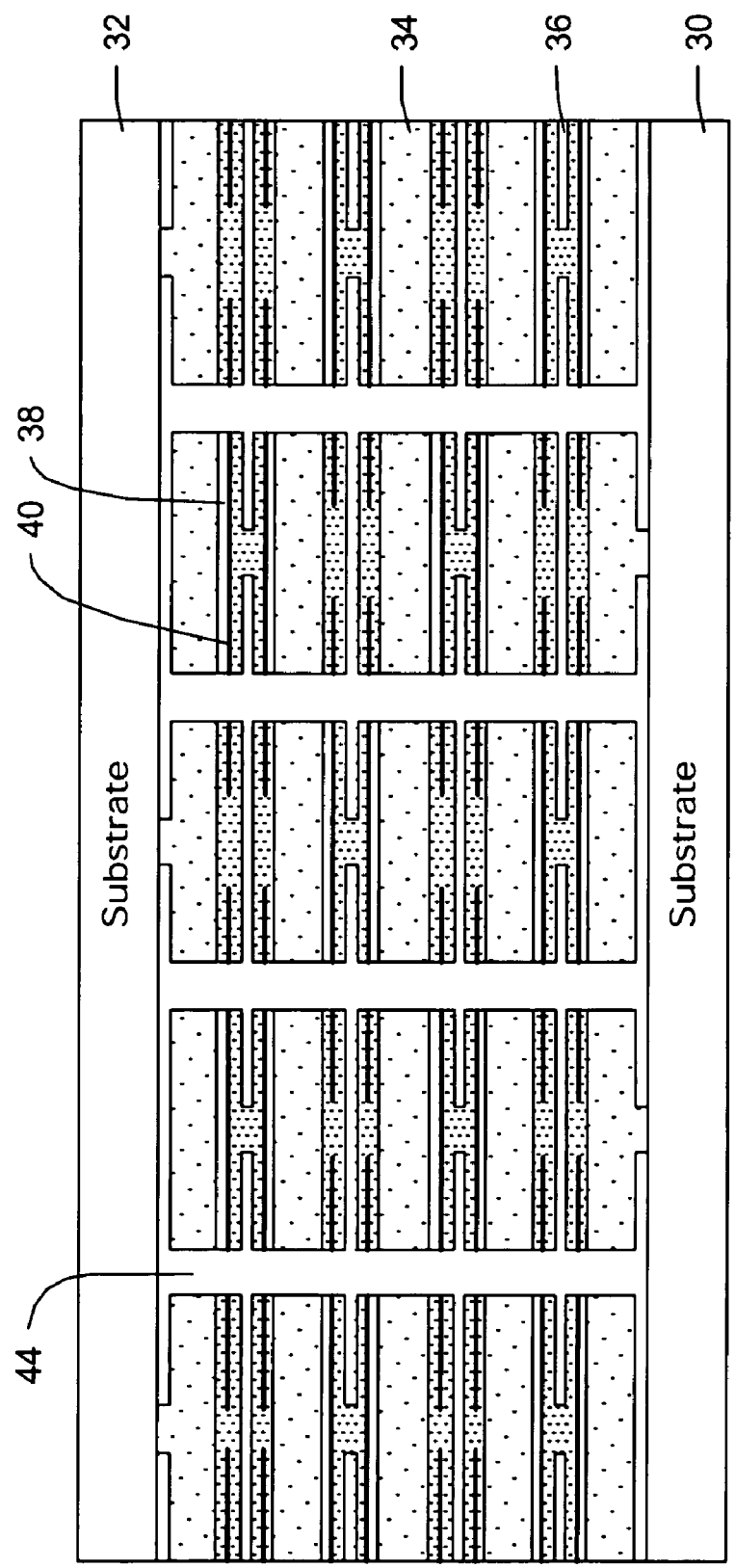
Figure 6:
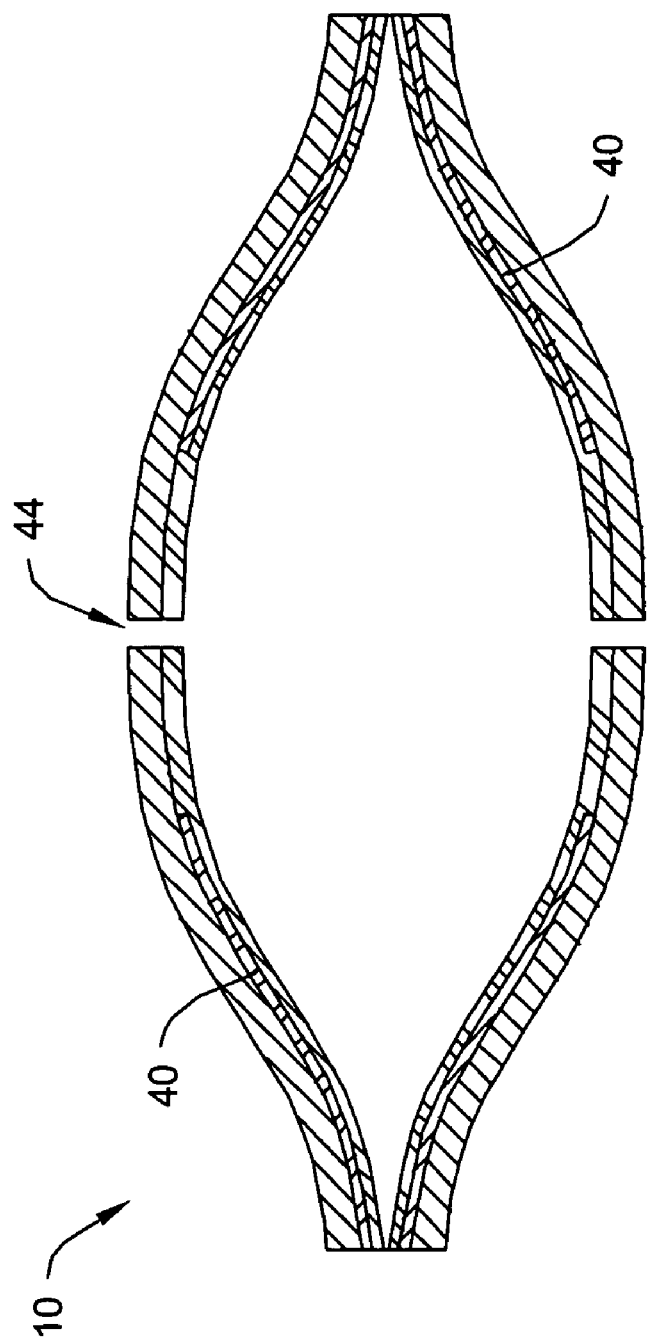

FIGS. 4–6 illustrate a method of manufacturing an illustrative array of unit cells. A first substrate 30 and a second substrate 32 are shown with a number of layers and features disposed in between. In the illustrative embodiment, several flexible layers 34 are separated by a structure composed of several pockets of sacrificial material 36, several layers of dielectric 38, and a number of thin conductive layers 40. While the structure of FIG. 4 could be constructed using micro-fabrication sputtering, deposition, etching and/or lithography methods, in one embodiment a number of laminations and/or ink-jet printing steps are used. An illustrative process for creating an array using ink-jet printing is shown and described in co-pending U.S. patent application Ser. No. 10/713,329, entitled A METHOD FOR MAKING DEVICES USING INK JET PRINTING. Other illustrative processes are shown and described in U.S. Pat. Nos. 6,411, 013, 6,255,758, and 6,184,608, all of which are incorporated herein by reference.

Any suitable materials may be used for each of the above noted elements. Without limiting the invention, one embodiment makes use of 5 to 10-micron thick sheets of spring steel for the flexible layers 34, 1-micron thick dielectric layers 38 made of $Al_2O_3$, 0.1-micron thick conductive layers 40 and 0.3-micron thick sacrificial layers. In another illustrative embodiment, a polymer may be used for the flexible layers 34. For example, existing polymer blends such as MYLAR® or KAPTON® (both registered trademarks of E.I. du Pont de Nemours & Co., Wilmington, Del.) may be used for the flexible layers 34.

In some embodiments, the number of layers may be reduced by making use of the same material for both the flexible layers 34 and the insulating layers 38, for example, a polyimide having a high dielectric constant or other polymer may be used. In yet another embodiment, the number of layers may be reduced by making use of a conductive material for flexible layers 34 and placing insulation layers 38 on the conductive flexible layers 38, where the conductive flexible layers 38 also perform the function of the metal electrodes 20 and 22.

FIG. 5 shows the illustrated array of FIG. 4 after additional processing steps. Several through holes 44 have been provided by laser ablation, although other methods may be used. The through holes 44 may be formed before the second substrate 32 is added, or, alternatively, through the one or more of the substrates 30 and/or 32. In some embodiments, the sacrificial layers may be removed through the through holes 44 to create openings within the structure. These openings 44 become the cavities for the unit cells. The through holes 44 may also be useful for, for example, reducing the effects of fluidic dampening on the movement of the actuator. That is, in some cases, as individual unit cells actuate from an expanded to a closed/collapsed configuration, the fluid (e.g. air) which fills the interior of the cell when expanded may be allowed to escape via the through holes 44. The same is true when the individual unit cells actuate from a closed/collapsed configuration to an expanded configuration. In some cases, the array may be constructed such that the individual unit cells within the array are open on one or both ends (the ends would come out of the Figure), allowing a filling fluid to escape there.

FIG. 6 shows an individual cell 10 subject to an expansion force. In this illustrative embodiment, the through hole 44 allows fluid to pass out of the unit cell 10. Also, in this illustrative embodiment, the conductive layers 40 (e.g. metal electrodes) are shown not spanning the entire width of the cell. By not having the conductive layers 40 reach the center of the cell 10, the cell 10 may not close entirely flat when a voltage is applied, which may help reduce the likelihood of stiction. Further anti-stiction features may also be provided including, for example, forming a rough surface or bumps (not shown) on the dielectric layers 38, if desired.

Figure 7:
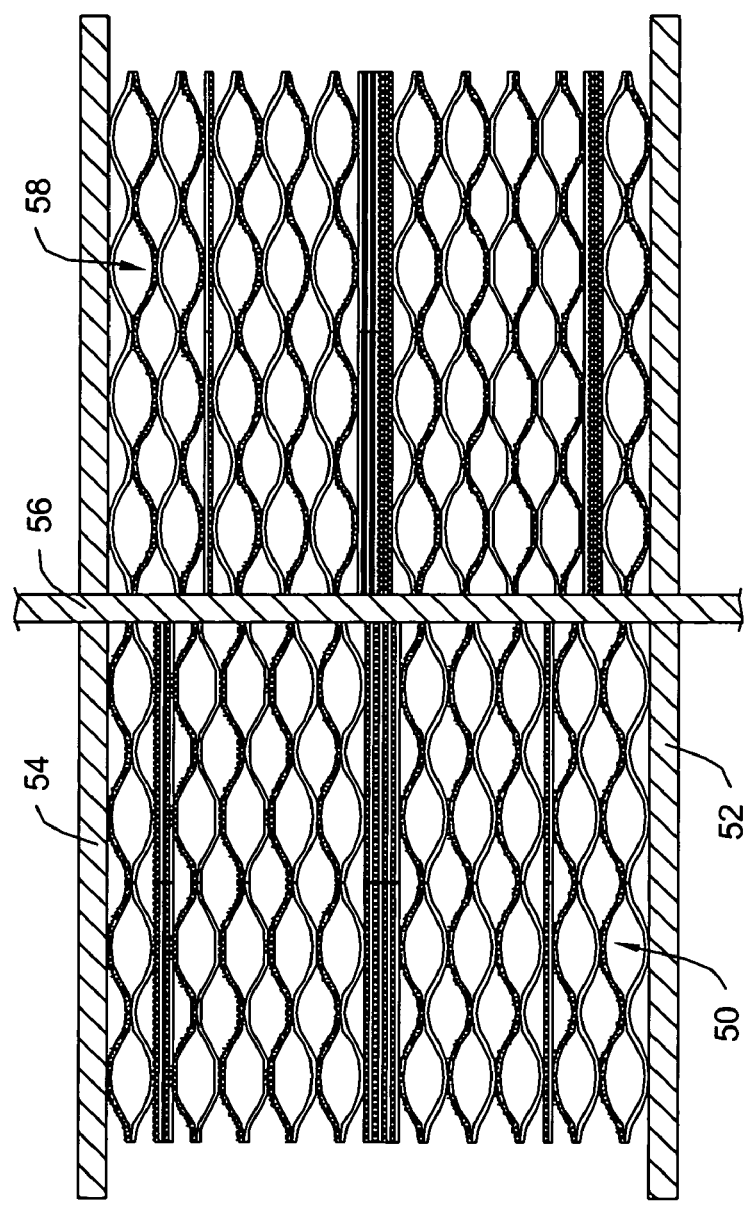
FIG. 7 is a schematic cross-sectional view of a pair of unit cell arrays coupled to two plates that are fixed at spaced locations to an axially rigid laterally flexible spine member.

FIG. 7 is a schematic cross-sectional view of a pair of unit cell arrays coupled to two spaced plates that are fixed at spaced locations along an axially rigid laterally flexible spine member. A first unit cell array 50 is shown disposed between a first plate 52 and a second plate 54. A spine member 56 is attached to the plates 52 and 54 at spaced locations. The spine member 56 may be a flexible wire spine, for example, or any other continuous or segmented relatively axially rigid, laterally flexible member. Opposite the first unit cell array 50 is a second unit cell array 58 also disposed between the first plate 52 and the second plate 54. The unit cell arrays 50 and 58 are attached to different regions of the plates 52 and 54 to allow the unit cell arrays 50 and 58 to exert a force between different regions of the plates 52 and 54. In the illustrative embodiment, the plates 52 and 54 are also spaced sufficiently far part so that the unit cell arrays 50 and 58 have at least several unit cells in an expanded state when un-activated.

The plates 52 and 54 may be attached to the substrates of the unit cell arrays 50 and 58, or, alternatively, the plates 52 and 54 may themselves comprise the substrates or pairs of substrates joined together from successive arrays. In some embodiments, the plates 52 and 54 may be printed circuit boards or the like that are capable of providing control signals to the unit cell arrays 50 and 58. In some cases, the plates may simply provide an electrical connection between a number of control lines that are provided along the length of the spine member 56, while in other cases, control or other processing circuitry may be provided on the plates to aid in the control of the corresponding unit cell arrays 50 and 58, as desired.

Figure 8:
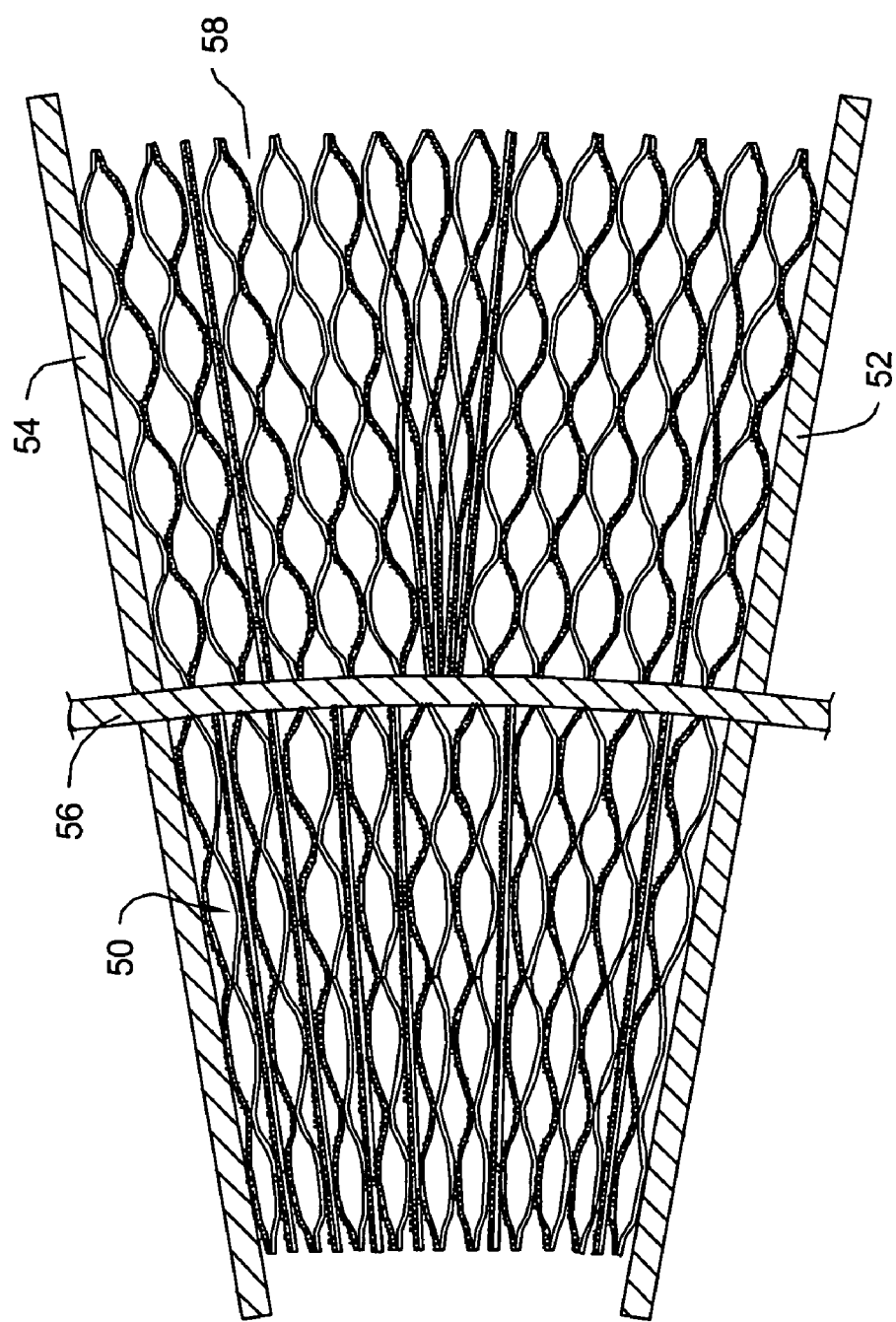
FIG. 8 is a schematic cross-sectional view of the embodiment shown in FIG. 7, when a sufficient voltage is applied to one of the unit cell arrays.

FIG. 8 is a schematic cross-sectional view of the embodiment shown in FIG. 7, after a sufficient voltage is applied to one of the unit cell arrays. In FIG. 8, a voltage or potential difference is applied to the unit cells of the first unit cell array 50. This causes a number of the unit cells in the first unit cell array 50 to close, thereby compressing the first unit cell array 50. As the first unit cell array 50 compresses, a pull force pulls the corresponding regions of the plates 52 and 54 towards one another, thereby curving the spine member 56 toward the side of the first unit cell array 50. At the same time, the plates 52 and 54 pivot about the spine member 56, causing the second unit cell array 58 to become further expanded or stretched. Overall, the result in the illustrative embodiment is that the elongated robotic member is curved in a first direction toward the first unit cell array 50.

In some illustrative embodiments, the unit cell arrays 50 and 58 may be addressed in whole or in part, or individual layers or groups of layers within an array may be separately addressable. This may allow greater control over the extent of force applied by unit cell arrays 50 and 58 to the plates, thus controlling the degree of deflection or bending of the spine member 56.

Figure 9:
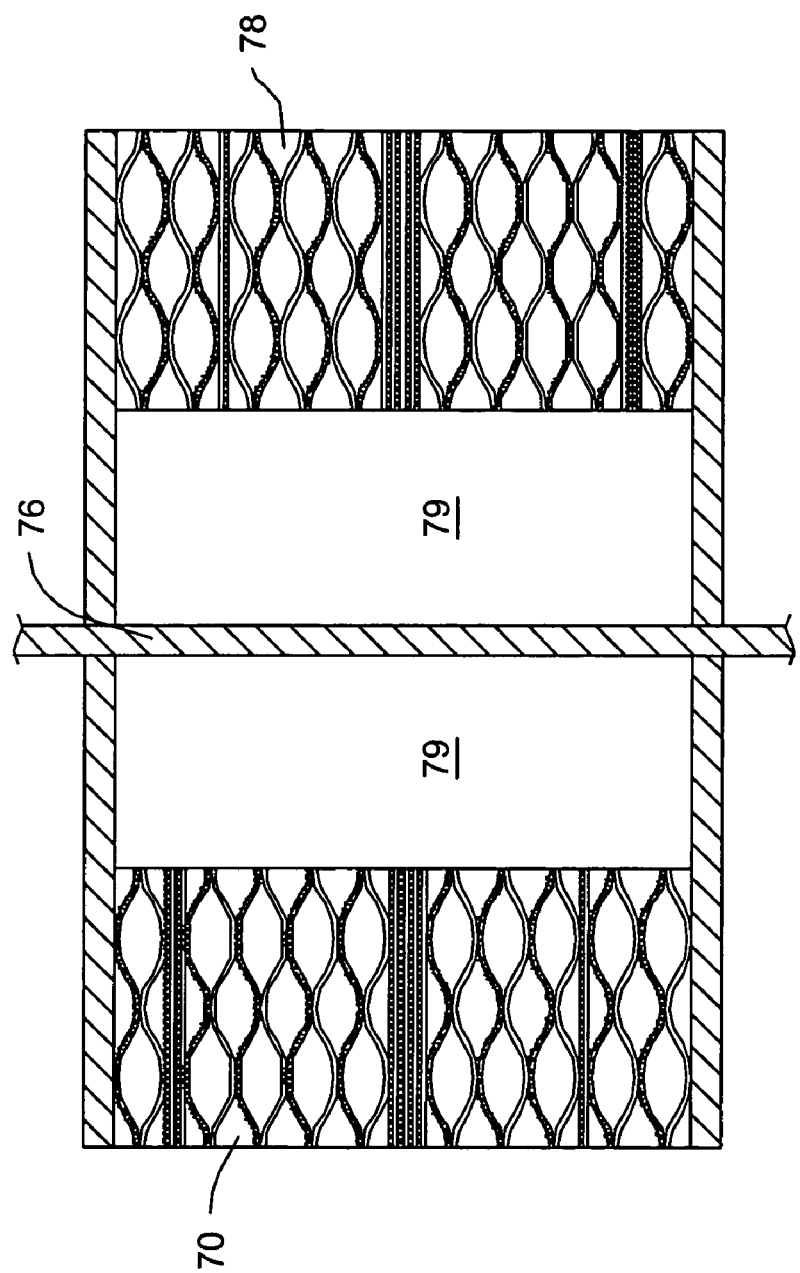
FIGS. 9–10 are schematic cross-sectional views of another illustrative embodiment of a pair of unit cell arrays coupled to two plates that are fixed at spaced locations to an axially rigid laterally flexible spine member.

In some cases, those unit cells nearer the spine member 56 may be discouraged from reaching a fully closed state because the spine member may prevent sufficient movement of the plates near the spine member. In those cases where the unit cells nearer the spine member 56 are discouraged or prevented from closing in response to an applied voltage, these unit cells may be removed, as they do not provide a significant advantage in terms of force generated versus weight and energy consumed. In light of the above, and in the illustrative embodiment shown in FIG. 9, the unit cell arrays 70 and 78 may be configured such that the unit cells are spaced from the spine member 76 as shown.

Not providing unit cells near the spine member 76 may have a number of other advantages. For example, the space 79 near the spine member 76 may allow for easier reduction of fluid drag on the movement of the individual cells by creating a greater volume of open space near the spine member 76. Also, the additional space may be used for control lines, control electronics, power sources (i.e. batteries), sensors or the like, or may be used to carry some amount of cargo or material, if desired.

Figure 10:
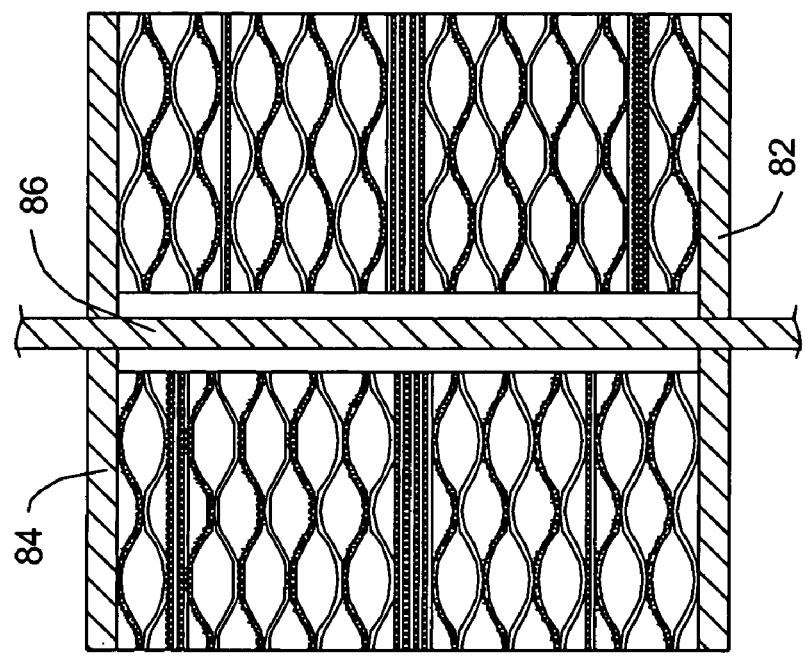

As shown in FIG. 10, it is contemplated that the distance along the spine member 86 between the two plates 82 and 84 may be increased relative to the diameter of the plates 82 and 84. This may allow the spine member 86 a greater range of lateral movement, but may result in less control over the shape of the spine member 86 in this region.

In some cases, the plates and spine member, along the length of the elongated robotic member, may have varying characteristics. For example, a rugged center section may be provided as in FIG. 9 to carry batteries, control electronics, and/or sensors in a region of relatively large diameter and closely space plates. Meanwhile, a section closer to either end of the elongated robotic member may be provided with smaller diameter places that have a relatively larger spacing to provide greater flexibility to help gain entry into more difficult spaces.

Sensors or other information receiving or sending devices (including cameras and antennae) may also be provided along the length or surface of the device, at or near an end of the device, or at any other suitable location. If a material is to be delivered to a location, a member having a fluid-carrying lumen may pass between the plates to reach a desired output location. If the device is to be used to sample material from a location, a storage reservoir and/or take-up device may be provided, as may a member having a fluid carrying lumen for transferring fluid to the reservoir. In some medical applications, the spine member may be hollow, and may be slipped over a guide wire or the like to be guided to a desired location with the body.

Figure 11:
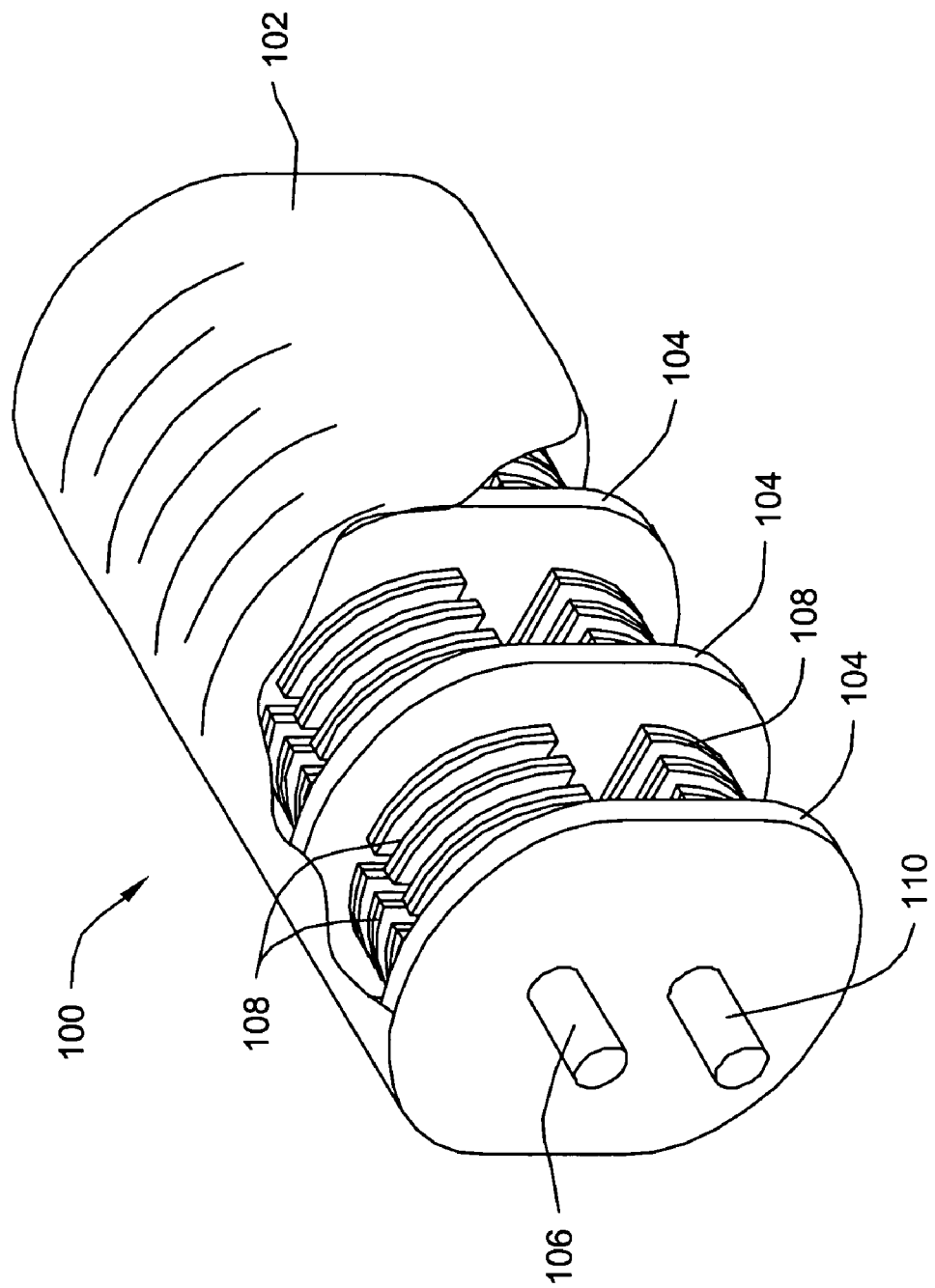
FIG. 11 is a partial cut-way perspective view of an elongated robotic snake in accordance with an illustrative embodiment of the present invention.

FIG. 11 is a partial cut-way perspective view of an elongated robotic snake in accordance with an illustrative embodiment of the present invention. The robotic snake 100 is constructed similar to that shown and described above, and may include a protective skin 102 or the like. The robotic snake 100 of FIG. 11 includes a number of ribs 104 (e.g. plates) fixed along the length of a spine member 106. Between each pair of ribs 104 are several actuators 108, which when activated, provide movement about the axis of the spine member 106. In some embodiments, two or more spine members may be provided, and the number of spine members may be changed along the length of the robotic snake. This may help control the desired or allowed degrees of freedom along the length of the robotic snake, if desired.

It is contemplated that the protective skin 102 may include a surface that creates greater friction in a first direction than in a second direction, a characteristic of the skin of a real snake which may aid in locomotion. An illustrative surface of such a "skin" is that commonly used on the bottom side of cross-country skis. In the illustrative embodiment of FIG. 11, a control line or bus 110 extends though the ribs 104 as well, and is coupled to at least selected actuators 108. In some cases, the control line or bus 110 may provide control signals to printed circuit connections on the ribs 104, where they are then routed to the appropriate actuators 108. The actuators 108 may be electrostatic actuators as illustrated above, or may be any other type of actuators, depending on the application.

In some embodiments, the spine member 106 may be relatively axially (longitudinally) stiff, but in some cases, may be able to contract under a force exerted, for example, by the actuators 108, particularly if several of the actuators 108 are actuated simultaneously. Thus, in some embodiments, the spine member 106 may include a spring-like, pneumatic, or other axially flexible member or element, allowing for axial compression. This may help the robotic snake 100 exert an axial force to aid in locomotion or burrowing, for example, in the manner used by earthworms. In other embodiments, it is contemplated that the spine member 106 may be relatively flexible or stiff in the side direction, depending on the application, and in some cases the flexibility of the spine member 106 may vary along its length as desired.

It is also contemplated that the robotic snake 100 of FIG. 11 may be controlled such that at least part of the body stiffens. For example, by actuating opposing actuators 108, force may be exerted on each side of a spine member 106, causing that region of the robotic snake to become stiffer. This joint stiffening can be used, for example, to cause a portion of the robotic snake 100 to stand erect, or to allow the robotic snake 100 to reach across an open space. For example, rather than having to go around a hole or depression, the robotic snake 100 may be stiffened to extend itself across the hole or depression.

Figure 12:
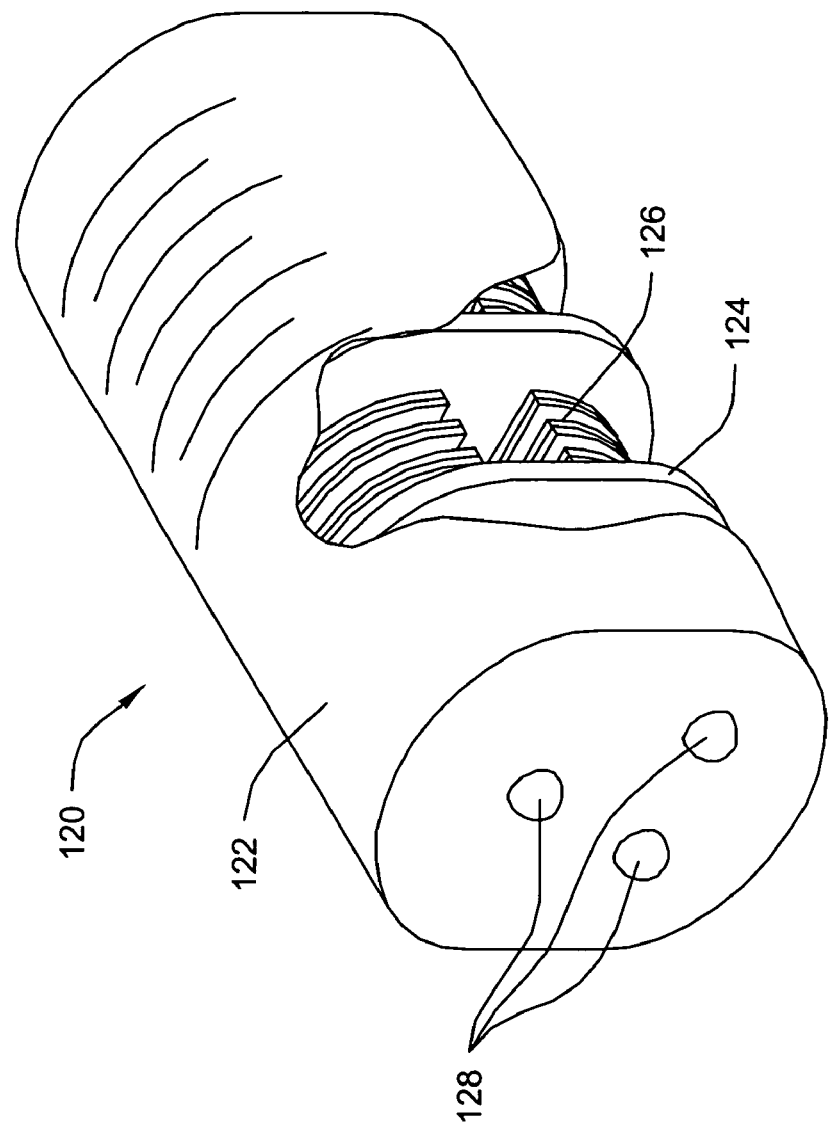
FIG. 12 is a partial cut-way perspective view of another illustrative elongated robotic snake in accordance with the present invention.

FIG. 12 shows a portion of another illustrative robotic snake including an end of the robotic snake. As in FIG. 11, the illustrative robotic snake 120 includes a protective skin 122, which is supported by a number of ribs or plates 124. Between the ribs 124 there are a number of actuator 126. On one end of the robotic snake 120, a number of devices 128 are placed. The devices 128 may include, for example, lights, cameras, microphones, speakers, sensors, etc. Some illustrative sensors include, for example, explosive or other chemical or biological sensors, pressure sensors, temperature sensors, etc. Additional sensors may be disposed on the skin 122 and/or ribs 124 to detect pressure and/or temperature, for example. Any of a number of other sensors and devices 128 may also be provided, and those noted are merely illustrative.

In some embodiments, two or more spine members may be provided, and the number of spine members may be changed along the length of the robotic snake. This may help control the desired or allowed degrees of freedom along the length of the robotic snake, if desired.

Figure 13:
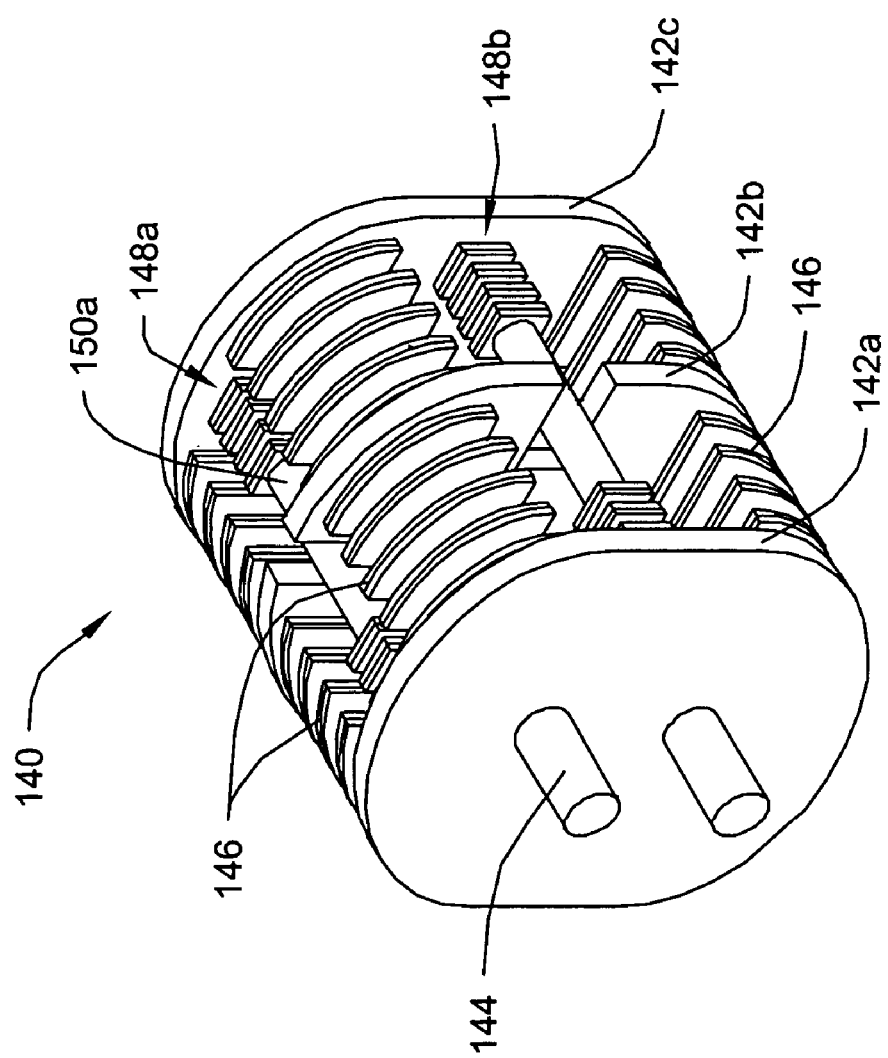
FIG. 13 is a partial cut-way perspective view of a section of another illustrative robotic snake in accordance with the present invention.

FIG. 13 is a partial cut-way perspective view of a section of another illustrative robotic snake in accordance with the present invention. The robotic snake is generally shown at 140, and is constructed similar to that shown and described above, except one or more actuators extend between non-adjacent ribs. For example, the robotic snake 140 includes a number of ribs 142a, 142b and 142c (e.g. plates) fixed along the length of a spine member 144. Like in FIG. 11, between each pair of ribs, such as ribs 142a and 142b, are several actuators 146, which when activated, provide movement about the axis of the spine member 144. Alternatively, or in addition, the robotic snake 140 may include several actuators, such as actuators 148a and 148b, which extend between non-adjacent ribs, such as ribs 142a and 142c. While the illustrative embodiment shows two actuators 148a and 148b connected between two ribs 142a and 142c that have one intervening rib 142b therebetween, it is contemplated that some actuators may be connected between two ribs with two, three or more intervening ribs, as further described below with respect to FIGS. 14–15. The intervening rib(s), such as rib 142b, can include one or more apertures, slots or other suitable relief structures that help provide a path for actuators 148a and 148b.

In the illustrative embodiment, actuator 148a includes a connector 150a, which is attached at each end to electrostatic actuators. When the electrostatic actuators are actuated, the corresponding portion of ribs 142a and 142c are pulled together, causing the snake to bend. The connector 150a may be an axially rigid structure, such as a wire, or even a string or any other material that can accommodate the pulling force of the actuators at each end.

In some embodiments, the connector 150a may be eliminated, and an actuator may extend from rib 142a and 142c. In other embodiments, an actuator may be positioned between ribs 142a and 142c, with a first connector connecting one end of the actuator to rib 142a and another connector connecting the other end of the actuator to rib 142c. In either of these illustrative embodiments, the actuators 148a and 148b may provide additional leverage and/or control over snake movement.

Figure 14:
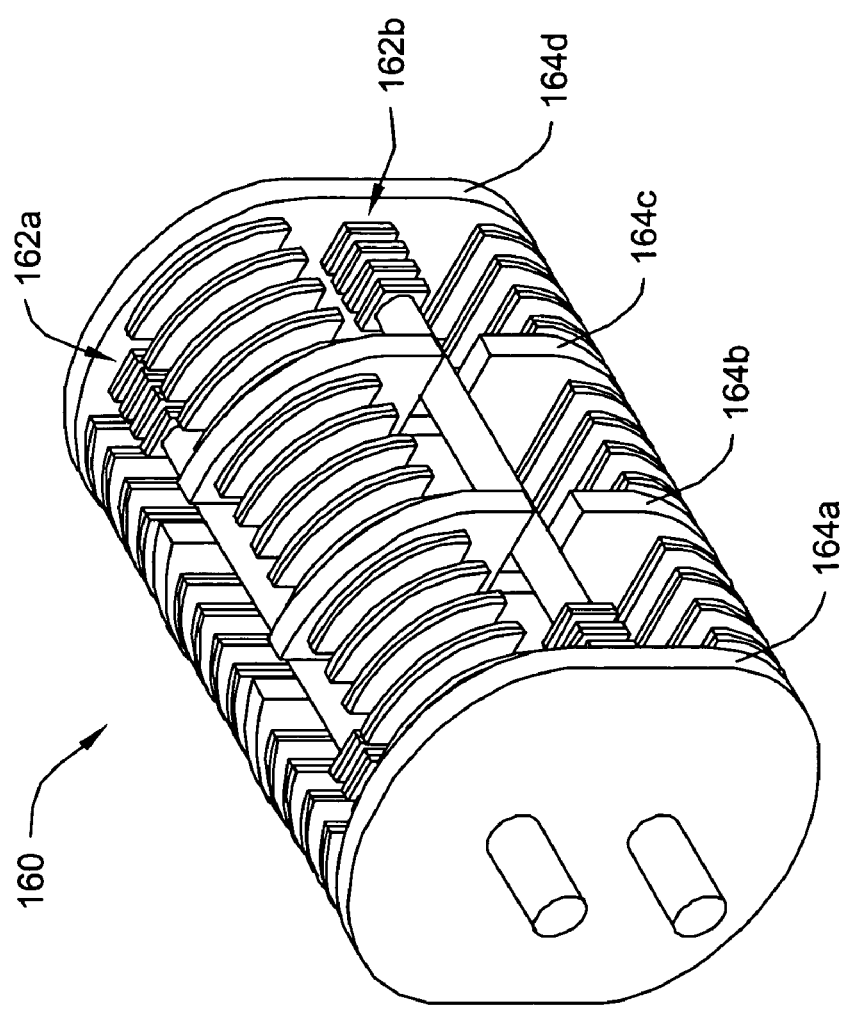
FIG. 14 is a partial cut-way perspective view of a section of another illustrative robotic snake in accordance with the present invention.

FIG. 14 is a partial cut-way perspective view of a section of another illustrative robotic snake 160 in accordance with the present invention. The robotic snake 160 is similar to that shown in FIG. 13, except that some of the actuators 162a and 162b are connected between two ribs 164a and 164d that have two intervening ribs 164b and 164c therebetween.

Figure 15:
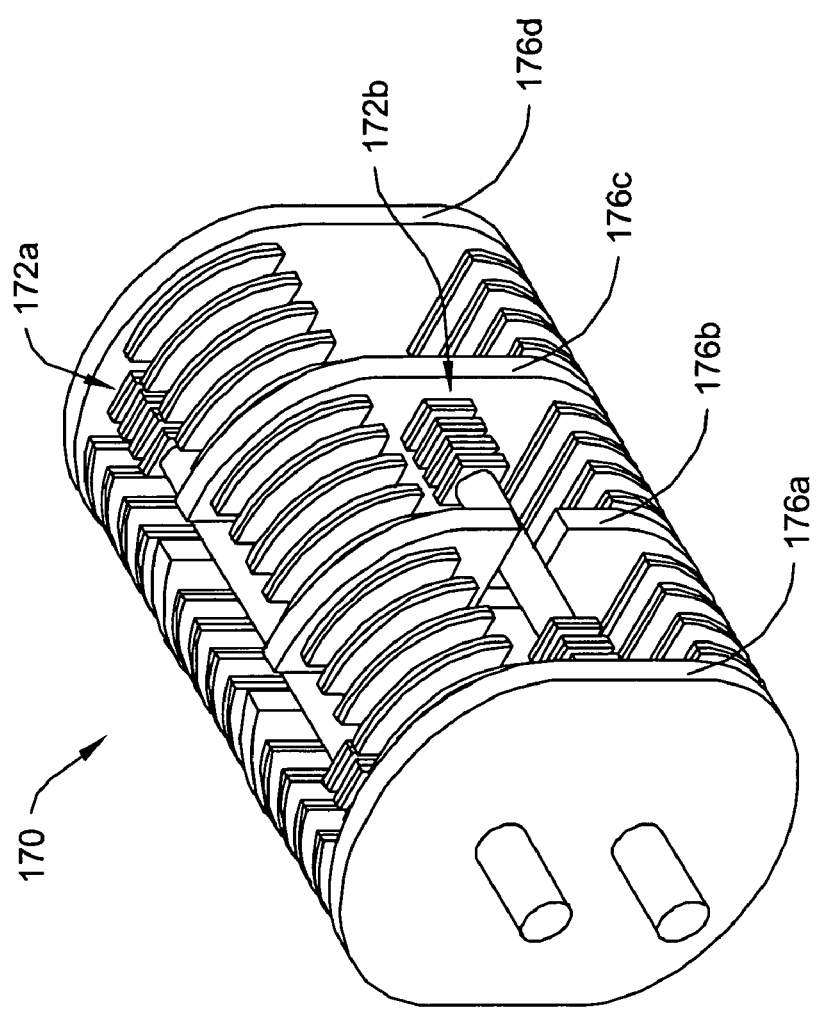
FIG. 15 is a partial cut-way perspective view of a section of yet another illustrative robotic snake in accordance with the present invention.

FIG. 15 is a partial cut-way perspective view of a section of another illustrative robotic snake 170 in accordance with the present invention. The robotic snake 170 is similar to that shown in FIG. 13, except that actuator 172a is connected between two ribs 176a and 176d that have two intervening ribs 176b and 176c therebetween, and actuator 172b is connected between two ribs 176a and 176c that have one intervening rib 176b therebetween. These embodiments are only illustrative, and show the flexibility of the elongated snake of the present invention.

The robotic snake of the present invention may be used in a variety of applications. For example, a very small profile robotic snake may be used as, for example, a catheter or in conjunction with a catheter. Alternatively, or in addition, the robotic snake may be used to traverse dangerous terrain in a mine sweep or other weapons detection role. The robotic snake may also be used to investigate rubble, for example, in a collapsed building, or to investigate caves or the like. Because the robotic snake of the present invention may be relatively lightweight and the "snake" design is useful for locomotion on both land and water (and indeed even under water), the robotic snake may also be used to investigate a flooded location such as a flooded cave, sewers, or other flooded location. In another illustrative embodiment, the robotic snake may be used as a toy.

In some cases, the robotic snake may be self-contained. In such embodiments, the robotic snake may include an onboard controller, batteries, sensors, etc. In other embodiments, some of the components may be located remote from the robotic snake. In some cases, commands may be transmitted to a controller of the robotic snake, and/or signals from sensors or the like of the robotic snake may be transmitted back, as desired.

Those skilled in the art will recognize that the present invention may be manifested in a variety of forms other than the illustrative embodiments described herein. Accordingly, departures in form and detail may be made without departing from the scope and spirit of the present invention as described in the appended claims.

What is claimed is:

1. An actuator device comprising:
    a spine member having a length;
    a first plate and a second plate, the first plate fixed to the spine member at a first location along the length of the spine member and the second plate fixed to the spine member at a second location along the length of the spine member, wherein the second location is spaced from the first location; and
    a first actuator positioned between the first plate and the second plate for selectively creating a push and/or pull force between the first plate and the second plate to change the orientation of the first plate relative to the second plate, the first actuator includes a first array of electrostatically actuated unit cells, wherein at least some of the electrostatically actuated unit cells are actuated from an expanded state to a closed state in response to an applied electric potential, and wherein at least some of the electrostatically actuated unit cells include:
    a first flexible member having a first electrode; and
    a second flexible member having a second electrode, wherein the first flexible member is attached to the second flexible member at selected spaced locations, wherein the first flexible member is pulled toward the second flexible member when the electric potential is applied between the first electrode and the second electrode.

2. The actuator device of claim 1 further comprising a second actuator positioned between the first plate and the second plate for selectively creating a push and/or pull force between the first plate and the second plate to change the orientation of the first plate relative to the second plate.

3. The actuator device of claim 2 wherein the first actuator is positioned in a first region between the first plate and the second plate, and the second actuator is positioned in a second region between the first plate and the second plate, wherein the first region is separate from the second region.

4. The actuator device of claim 3 wherein the spine member passed between the first region and the second region.

5. The actuator device of claim 2 further comprising:
    a third actuator positioned between the first plate and the second plate for selectively creating a push and/or pull force between the first plate and the second plate to change the orientation of the first plate relative to the second plate;
    a fourth actuator positioned between the first plate and the second plate for selectively creating a push and/or pull force between the first plate and the second plate to change the orientation of the first plate relative to the second plate.

6. The actuator device of claim 5 wherein the first actuator, the second actuator, the third actuator and the fourth actuator are positioned in separate regions between the first plate and the second plate.

7. The actuator device of claim 6 wherein the separate regions are selectively spaced around the spine member.

8. The actuator device of claim 7 wherein the separate regions are disposed symmetrically about the spine member.

9. The actuator device of claim 8 wherein each of the separate regions correspond to one of four quadrants about the spine member.

10. The actuator device of claim 1 wherein the spine member bends when the orientation of the first plate is changed relative to the second plate.

11. A flexible member comprising:
    a spine member having a length;
    three or more plates attached at spaced locations along the length of the spine member, selected plates forming a plate pair, at least some of the plates extending out and forming ribs that support an outer skin of the flexible member; and
    one or more actuators positioned between and fixed to at least selected plate pairs for creating a push and/or pull force between the corresponding plate pair and to change the relative orientation of the plate pair.

12. The flexible member of claim 11 wherein each of the one or more actuators includes an array of flexible unit cells capable of actuating from an expanded state to a closed state in response to an applied electric potential.

13. The flexible member of claim 12 further comprising a controller for selectively controlling the actuation of the one or more actuators to create a desired motion of the flexible member.

14. The flexible member of claim 11 further comprising one or more sensors for sensing one or more environmental conditions in the vicinity of the flexible member.

15. The flexible member of claim 14 further comprising a transmitter adapted to transmit signals related to data captured by the one or more sensors.

16. The flexible member of claim 13 further comprising a receiver for receiving commands and for providing the commands to the controller.

17. The flexible member according to claim 11 wherein each of the two or more plates define a major surface, wherein the spine member intersects and is attached to the two or more plates near the center of the major surface.

18. The flexible member according to claim 11 wherein each of the two or more plates define a major surface, wherein the spine member intersects and is attached to the two or more plates at a location that is offset from the center of the major surface.

19. The flexible member according to claim 11 wherein each of the two or more plates define a major surface, wherein the spine member intersects and is attached to the two or more plates at or near an edge of the major surface.

20. A flexible member, comprising:
an elongated body having a length;
one or more electrostatically actuated actuators positioned at selected locations along the length of the elongated body, the one or more electrostatically actuated actuators, when activated, providing a force in the length direction of the elongated body to change the shape of the flexible member; and
a controller for controlling the one or more electrostatically actuated actuators.

21. An actuator device comprising:
a spine member having a length;
a first plate and a second plate, the first plate fixed to the spine member at a first location along the length of the spine member and the second plate fixed to the spine member at a second location along the length of the spine member, wherein the second location is spaced from the first location;
a first actuator positioned between the first plate and the second plate for selectively creating a push and/or pull force between the first plate and the second plate to change the orientation of the first plate relative to the second plate, wherein the first actuator includes a first array of electrostatically actuated unit cells, wherein at least some of the electrostatically actuated unit cells include a through hole for reducing fluidic dampening of movement of the unit cells.

22. A flexible member comprising:
a spine member having a length;
two or more plates attached at spaced locations along the length of the spine member, selected plates forming a plate pair;
one or more actuators positioned between and fixed to at least selected plate pairs for creating a push and/or pull force between the corresponding plate pair and to change the relative orientation of the plate pair; and
an outer sheath sized to fit over the two or more plates, the outer sheath being adapted so that in a first direction along the length of the spine member the outer sheath has a first resistance to sliding motion, and in an opposite direction along the length of the spine member the outer sheath has a second resistance to sliding motion, the first resistance to sliding motion being greater than the second resistance to sliding motion.

23. A flexible member comprising:
a spine member having a length;
two or more plates attached at spaced locations along the length of the spine member, selected plates forming a plate pair, and wherein at least selected plates are printed circuit boards; and
one or more actuators positioned between and fixed to at least selected plate pairs for creating a push and/or pull force between the corresponding plate pair and to change the relative orientation of the plate pair.

24. The flexible member of claim 23 wherein at least selected printed circuit boards have one or more traces that are electrically coupled to at least one of the actuators to provide one or more control signals to the at least one actuator.

25. A flexible member comprising:
a spine member having a length;
two or more plates attached at spaced locations along the length of the spine member, selected plates forming a plate pair;
one or more actuators positioned between and fixed to at least selected plate pairs for creating a push and/or pull force between the corresponding plate pair and to change the relative orientation of the plate pair; and
one or more intervening plates positioned between a selected plate pair.

26. The flexible member of claim 25 wherein the one or more intervening plates include one or more relief structures that provide a path for the one or more actuators that extend between the selected plate pair.

27. An actuator device comprising:
a spine member having a length;
a first plate and a second plate, the first plate fixed to the spine member at a first location along the length of the spine member and the second plate fixed to the spine member at a second location along the length of the spine member, wherein the second location is spaced from the first location, and wherein the spine member is a unitary member with no pivot joints; and
a first actuator positioned between the first plate and the second plate for selectively creating a push and/or pull force between the first plate and the second plate to change the orientation of the first plate relative to the second plate.

* * * * *